April 21, 1931.  J. W. LEGG  1,801,814
RECORDING SYSTEM
Filed April 11, 1927   2 Sheets-Sheet 1

WITNESSES:
C. J. Weller
Lyman D. Oberlin

INVENTOR
Joseph W. Legg.
BY
ATTORNEY

April 21, 1931.  J. W. LEGG  1,801,814
RECORDING SYSTEM
Filed April 11, 1927  2 Sheets-Sheet 2
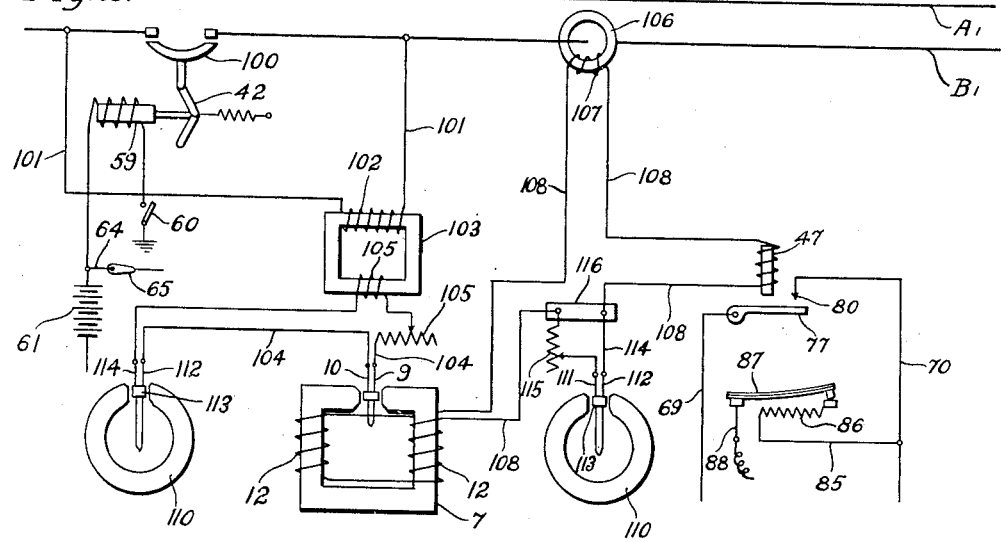
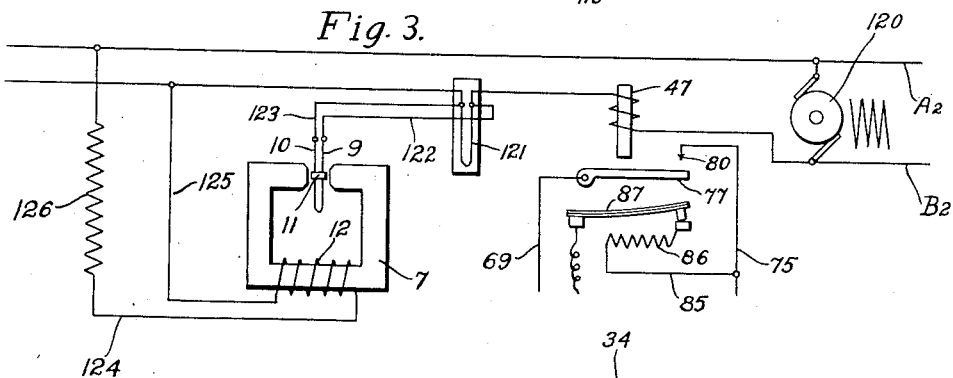
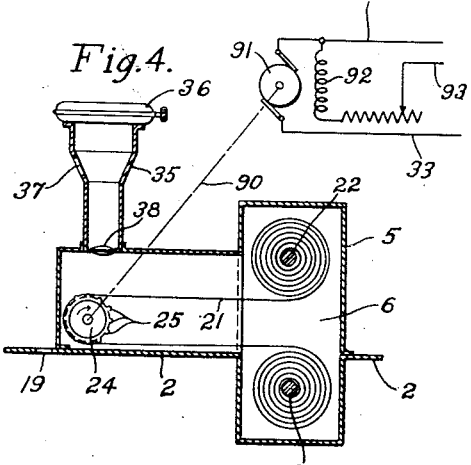
WITNESSES:
INVENTOR
Joseph W. Legg.
BY
ATTORNEY Patented Apr. 21, 1931

1,801,814

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

RECORDING SYSTEM

Application filed April 11, 1927. Serial No. 182,652.

My invention relates to recording systems and comprehends a method of and apparatus for forming a record indicative of a characteristic, as magnitude, of a quantity, as one that is of an electrical nature, for example, current, electromotive force or power, or one that is of a non-electrical nature.

In accordance with my invention, operation of an oscillograph or recording system utilizable for forming a record indicative of a characteristic of a quantity is instigated by the occurrence of an event changing said characteristic, which event may be a manually-effected control and, when the quantity is of an electrical nature, the occurrence of an abnormal circuit condition, either chance or otherwise, as a short circuit, excessive flow of current, sub-normal voltage, or the like, such abnormal circuit condition being hereinafter characterized as a "transient."

Further in accordance with my invention, an oscillograph system of the character aforesaid comprises a vibratory system actuated when an electrical current traverses a conductor in a magnetic field, the instantaneous magnitude of said current being dependent upon or varying as a characteristic of a quantity, such as the instantaneous magnitude of an electrical current or electromotive force.

Further in accordance with my invention, a beam of energy coacting with a sensitized surface is controlled or deflected in accordance with changes in the instantaneous magnitude of an electrical current, as effected by the occurrence of an event as aforesaid, the event also causing the actuation of suitable mechanism to record or indicate the time at which the event occurred, preferably directly upon the sensitized surface.

Further in accordance with my invention, a system of the character aforesaid comprises a light-sensitive surface and a vibratory system for directing a beam of light thereon, the system vibrating in accordance with changes in the instantaneous magnitude of an electrical current, as effected by the occurrence of an event, and the light-sensitive surface being movable with respect to the vibratory system either before, after, or while, but preferably after, a record has been formed thereon indicative of the time of occurrence of the event.

Further in accordance with my invention, a recording or oscillograph system of the character described is designed to automatically form a record showing changes in a characteristic of the observed quantity whenever there occurs an event as described above, the system automatically functioning for a suitable period, upon the occurrence of each event, to form a record indicative of the time of occurrence thereof and of changes in the characteristics of the quantity.

My invention resides in the method, system, apparatus and features of construction of the character hereinafter described and claimed.

For an understanding of my method and for an illustration of some of the forms my system or apparatus may take, reference is to be had to the accompanying drawings, in which:

Fig. 2 is a fragmentary diagrammatic view illustrating a different form of circuit arrangement to be studied;

Fig. 3 is a fragmentary diagrammatic view illustrating still another form of circuit arrangement to be studied; and Fig. 4 is a diagrammatic view illustrating a modified form of mechanism for moving the light-sensitive film.

Figure 1:
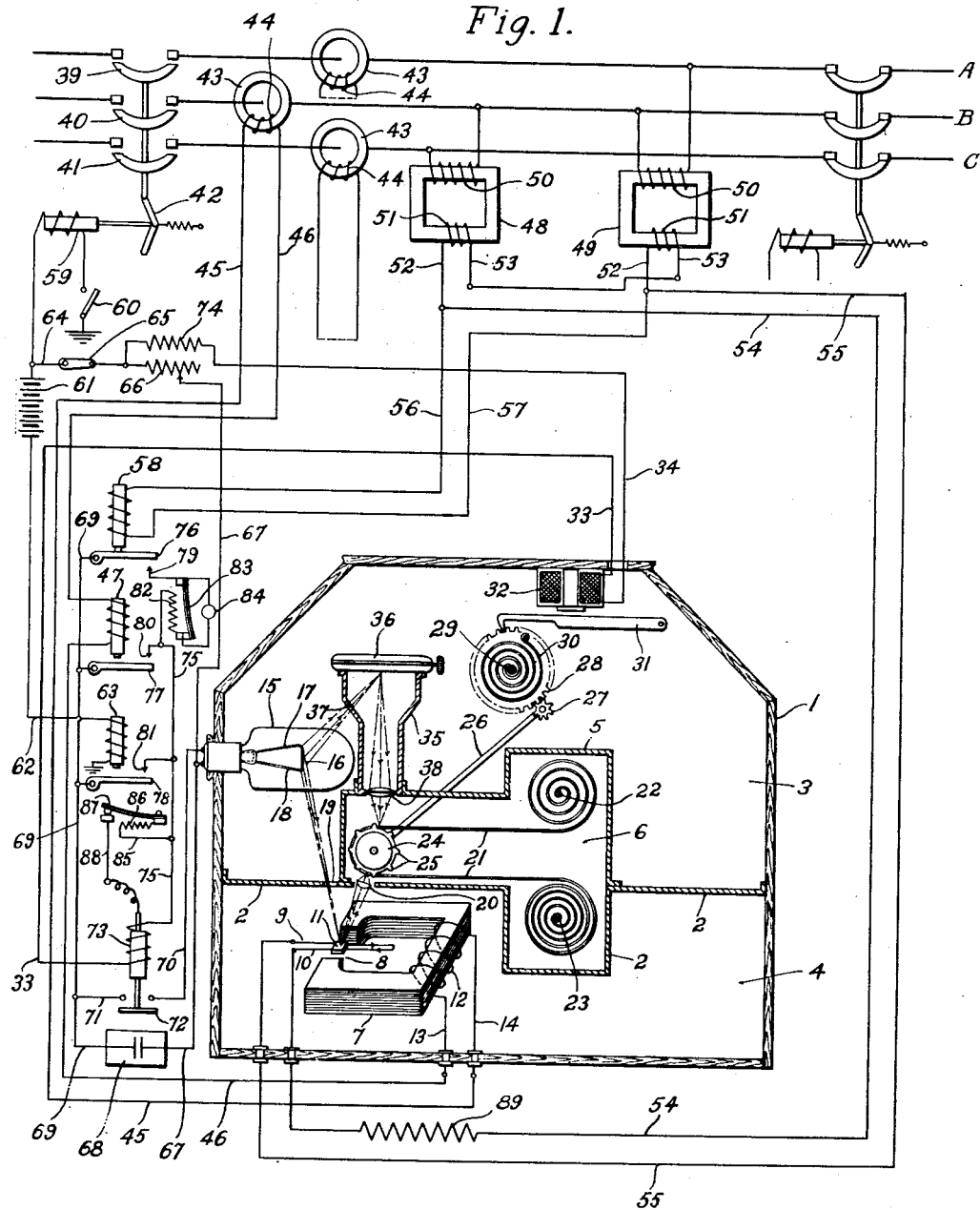
Figure 1 is a diagrammatic view of apparatus constructed in accordance with my invention.

In Fig. 1, is illustrated the housing or casing 1 divided by a wall 2 into upper and lower compartments 3 and 4. Suitably secured to the wall 2 is a member or partition 5 forming a chamber 6 in the upper compartment 3.

In accordance with my invention, galvanometer mechanism of any suitable character may be disposed within the casing 1, and preferably in the compartment 4. This mechanism may be of the type disclosed in my pending applications Serial No. 757,586, filed December 23, 1924, and Serial No. 5,166, filed January 27, 1925, but, as illustrated in Fig. 1, conforms to that shown in my pending application Serial No. 182,653, filed April 11, 1927. As described in said last named application, movement is imparted to the vibratory system of the galvanometer mechanism in accordance with changes in the instantaneous magnitudes of the currents individually traversing the field winding and a conductor in the flux gap of said galvanometer mechanism. As stated in said last named application, the galvanometer mechanism may comprise a generally rectangular laminated magnetizable structure 7 having spaced pole faces forming an air gap 8. A suitably supported pair of conductors 9 and 10 disposed within the aforesaid air gap 8 have a mirror 11 secured thereto, the conductors 9 and 10 and mirror 11 constituting the deflecting or vibratory system of the galvanometer. Coacting with the structure 7 to develop the magnetic flux traversing its air gap, is the field coil or winding 12 terminating in the conductors 13 and 14. As is well understood, current passes along one conductor, for example, conductor 9, in one direction and then along conductor 10 in the reverse direction; since these conductors carry current at right angles to the lines of force of the magnetic field developed by coil 12, a motor action results, whereby oscillatory or vibratory movement is imparted to said conductors and the mirror 11.

Suitably supported by, and within, the casing 1, preferably in its upper compartment 3, is the evacuated bulb 15 herein illustrated as conforming to the one shown in my pending application Serial No. 752,427, filed November 26, 1924, and, therefore, comprising a straight filamentary conductor 16, to opposite ends of which the conductors 17 and 18 are connected.

When the conductor 16 is heated to incandescence, as hereinafter particularly described, light rays emanating therefrom pass through an opening 19 in the wall 2 to the mirror 11. From the mirror, the light rays are so reflected as to cause them to pass through the condensing lens 20, which acts to focus said rays as a spot of light upon the light-sensitive member, surface or film 21.

In the example illustrated, member 21 comprises ordinary flexible photographic film, the exposed and unexposed portions of which are wound, respectively, on the spools or bobbins 22 and 23, the former being under the influence of a structure, (not shown), tending to rotate the same in a counter-clockwise direction, (Fig. 1). Between the spools 22 and 23, the film traverses a drum 24 having, when the film edges are perforated, a series of spaced projections 25 adapted to enter the perforations of the film.

Intermittent movement may be imparted to the film 21 in any suitable manner. In the example illustrated in Fig. 1, a shaft 26 extends from drum 24 and has connected thereto a gear 27 meshing with a gear 28 mounted on a shaft 29. A spring motor 30 is adapted, when released, to rotate gear wheels 28 and 27, and shaft 26 in such direction that clockwise movement (Fig. 1) is imparted to drum 24. As illustrated, the aforesaid motor 30 is controlled by a pawl 31 having a tooth normally lying between adjacent teeth of the gear 28, movement of the pawl being controlled by an electromagnet comprising a coil or winding 32 to the terminals of which the conductors 33 and 34 are connected.

Extending from, and secured to, the member 5 is a casing 35 upon which is mounted a suitable time-indicating device, herein illustrated as an eight day watch or clock 36. A clock of this character comprises members for indicating not only the time of the day, but the day of the week, as well, and, in some instances, the day of the month. Some of the light rays emitted by the filament 16 pass through an opening 37 in the casing 35 and illuminate the face of clock 36, from and by which, the rays are reflected through the lens 38 upon the light-sensitive surface of the film 21.

Apparatus of the character hereinbefore described is designed to form a record indicative of the instantaneous magnitudes of the electrical power transmitted by a system of any character transmitting either direct or alternating current, after the occurrence of some event disturbing or changing the prior-existing condition of said system. Accordingly, both the field winding and vibrator system of the galvanometer mechanism may be permanently connected to the power system and, upon occurrence of the transient or other event, filament 16 is quickly brought to a state of incandescence, film 21 has imprinted thereon a representation of the face of the clock 36, and pawl 31 is attracted by electromagnet 32, with resultant movement of film 21, all of which occurs while mirror 11 is being oscillated in accordance with changes in the instantaneous magnitudes of the electrical power transmitted by the system.

In Fig. 1, is illustrated a three-phase power system comprising the conductors A, B and C, rupture of which is effected by a switch or circuit breaker having the members 39, 40 and 41 to which the actuating member or toggle 42 is connected.

To such system, may be connected any suitable circuit arrangement for effecting operation of the recording mechanism. In the example illustrated, each of the conductors A, B and C serves as the primary for a current transformer 43, each of which has a secondary winding 44. The secondary windings 44 may be connected in a suitable network, (not shown), in a manner understood to those skilled in the art, whereby a current is obtained in the output circuit thereof, the value of which is a function of the currents traversing the three conductors A, B and C. In practice, however, the current traversing one of said conductors is roughly proportional to the average of the currents in all of said conductors and, hence, particularly for purposes of illustration, the secondary of one of the aforesaid transformers 43 may be utilized in lieu of the output circuit of the aforesaid network. Accordingly, in Fig. 1, one of the transformers 43 is illustrated as having one terminal of its secondary 44 connected by a conductor 45 to the conductor 14, which, as stated above, forms one terminal of the winding 12. The other terminal of said secondary 44 is connected by a conductor 46, in which is included the winding of a relay 47, to the conductor 13 forming the other terminal of the winding 12. In this manner, the flux density in the air gap 8 is maintained proportional to the current traversing the conductor B.

As stated in my aforesaid application Serial No. 182,653, the current traversing conductors similar to the conductors 9 and 10 may be maintained proportional to the voltage across the power system. To this end, potential transformers 48 and 49 may be utilized which have their primary windings 50 connected, respectively, across the conductors B, C and A,B. Each of the secondary windings 51 of the aforesaid transformers comprises the terminals 52 and 53, the latter being connected together and the former being connected, respectively, to the conductors 54 and 55, the former leading to the conductor 10 and the latter leading to the conductor 9. Connected by conductors 56 and 57 across the aforesaid conductors 54 and 55 is the winding of a relay 58.

For actuating the aforesaid toggle mechanism 42 to close the circuit-breaker members 39, 40 and 41 upon their respective fixed contacts, an electromagnet 59 may be utilized, one terminal of which leads to the switch 60 and thence to ground. The other terminal of said winding is connected to one terminal of a suitable source of electrical energy, herein illustrated as a battery 61 having an electromotive force, preferably of approximately 110 volts. The other terminal of battery 61 is connected, by a conductor 62, to the winding of a relay 63, the other terminal of which leads to ground.

Branching from one terminal of battery 61 is the conductor 64 connected, through the switch 65, to one end of the resistor element 66. A contact adjustably coacting with the resistance 66 is connected, by a conductor 67, to one terminal 18 of the filament 16. Conductor 67 also leads to one terminal of the condenser 68, the other terminal of which is connected by a conductor 69 to the terminal of battery 61 opposite in polarity to the terminal thereof to which conductor 64 is connected. The terminal 17 of filament 16 is connected, by a conductor 70, to a fixed contact which, with another fixed contact connected by a conductor 71 to conductor 69, is bridged by a conductive element 72 carried by the armature or solenoid of an electromagnet 73.

The conductor 34 of relay 32 leads to the same terminal of battery 61 as conductor 64 and, hence, said conductor 34 may be connected to conductor 64, as illustrated. Ordinarily, a resistor 74 should be included in the conductor 34 to prevent excessive flow of current through the winding 32. Conductor 33 of relay 32 leads to one terminal of the winding of electromagnet 73, to the other terminal of which a conductor 75 is connected.

Conductively related to the conductor 69 are the armatures 76, 77 and 78, coacting, respectively, with the relays 58, 47 and 63. Armature 76, upon deenergization of relay 58, closes upon a fixed contact 79 while armatures 77 and 78, upon energization of their respective relays 47 and 63, close, respectively, upon the fixed contacts 80 and 81. All of the aforesaid contacts 79, 80 and 81 are conductively related to the conductor 75 in which, between the contacts 79 and 80, is included the resistor 82 and the thermostatic or bimetallic element 83 normally closed upon its fixed contact at one end of resistor 82. Connected across the terminals of the thermostatic element 83 is a suitable heating structure or signal device herein shown as an incandescent lamp 84.

Conductor 75, between its connection to the winding of electromagnet 73 and the contact 81, has connected thereto a conductor 85 in which is included a heating element, as the resistor 86. In series with conductor 85 and resistor 86 is a thermostatic or bimetallic element 87, the movable end of which coacts with a contact connected by a conductor 88 to the solenoid of electromagnet 73.

As described in my aforesaid application Serial No. 182,653, a resistance 89 should be included in the circuit, when inductive, comprising the conductors 54 and 55 which, as stated above, are connected to the conductors 10 and 9 on which the mirror 11 is supported, whereby the current in the conductors 10 and 9 is kept at a reasonable value and in phase with the line voltage.

The operation is as follows:

With switch 65 closed, it will be observed that one side of the condenser 68 is permanently connected, by way of conductor 67, resistance 66, switch 65 and conductor 64, to one terminal of battery 61, while the other side of said condenser is likewise permanently connected, by way of conductors 69 and 62, to the other terminal of battery 61. As a result, condenser 68 is maintained in charged condition to an extent depending upon the voltage of battery 61, which, as stated above, should be of the order of 110 volts, and, at this voltage, the capacity of condenser 68 should be of the order of 40 microfarads, when utilizing a time-indicating device as herein described.

Relay 58 normally holds its armature 76 attracted but, in the event of substantial drop in voltage across the conductors B and C or conductors A and B, the armature is released and moves into engagement with its contact 79.

Only upon occurrence of current in the line of excessive or predetermined high magnitude does the relay 47 attract its armature 77 and move the same into engagement with its contact 80.

If the switch comprising the contact members 39, 40 and 41 is open, switch 60 may be closed, with resultant energization of electromagnet 59. As a result, relay 63 is energized and its armature 78 attracted and moved into engagement with contact 81.

When any of the aforesaid armatures 76, 77 and 78 close upon their respective contacts 79, 80 and 81, coil 32 and electromagnet 73 are connected in series with battery 61. Thus, if armature 76 closes upon its contact 79, a circuit is completed from said contact 79 by way of conductors 83, 82 and 75 to and through the winding of electromagnet 73 and thence, by way of conductor 33, to and through the coil 32. From coil 32, the circuit extends, by way of conductor 34, to the resistance 74 and thence, by way of switch 65 and conductor 64, to one terminal of battery 61, the other terminal of which is connected, by conductors 62 and 69, to armature 76.

When electromagnet 73 is energized, the contact member 72, carried by its armature, is moved into engagement with the contacts in which the conductors 70 and 71 terminate. As a result, the charged condenser 68 is connected across the terminals of the filament 16. The capacity of condenser 68 should be of such value, for example, 40 microfarads, more or less, when the filament 16 is designed for current of one-half ampere at four volts, that for a very brief period, the quantity of energy supplied to the filament 16 is abnormally high. In fact, the condenser 68 should be of such character and should be so charged, that, during the momentary period of discharge, abnormally high current at abnormally high voltage is supplied to filament 16, thereby to bring it to incandescence without the lapse of appreciable time and to such high degree of incandescence that it is many fold, for example, tenfold, more or less, brighter than under normal conditions. Further, filament 16 may be so quickly brought to, and only momentarily retained at, such high degree of luminosity that the face of the time-indicating device 36 may be photographed, with little or no blurring, on the film 21, even though the latter is moving.

As stated above, coil 32 is energized simultaneously with electromagnet 73. When thus energized, coil 32 attracts its armature 31, and the spring motor 30 rotates gear 28 and the thereto-connected mechanism in such sense that the upper and lower spans of film 21 are moved, respectively, from left to right and right to left (Fig. 1).

Usually, however, before the inertia of this film-moving mechanism has been overcome, and therefore, while film 21 is still stationary, filament 16 has been brought to a high degree of incandescence, as stated above. Some of the light rays emitted therefrom pass through the opening 37 and illuminate the face of clock 36 from which they are reflected through lens 38 upon the light-sensitive face of film 21, whereby a record is imprinted thereon of the time of the occurrence of the event causing operation of any of the aforementioned relays 58, 47 or 63.

Condenser 68 discharges in an exceedingly brief period of time, a period so short that damage to filament 16 by the excessive amount of energy supplied thereto is unlikely. After discharge of said condenser, the filament is maintained preferably at its normal degree of luminance by the battery 61 which, upon closure of member 72 upon the terminals of conductors 70 and 71, was connected, thru resistance 66, across the terminals 17 and 18 of said filament 16. When the abnormal current from the condenser 68, into filament 16, has subsided, the resistor 66 drops the potential of battery 61 to the normal potential of the filament 16, so as to keep the filament heated to a safe temperature.

When filament 16 was initially brought to incandescence and, during continued luminosity thereof, some of the light rays emitted therefrom passed through the openings 19 and illuminated the mirror 11 by which said rays were refracted through the lens 20 substantially as a point of light on the light-sensitive surface of film 21. Since, in the example illustrated in Fig. 1 the actuating structure for the mirror 11 is of the character described in my aforesaid pending application Serial No. 182,653, the record on the moving film 21 is indicative of the instantaneous magnitudes of the power transmitted over the circuit comprising the conductors A, B and C during persistence of a period of operation instigated by the relays 58, 47 and 63, or any of them.

When electromagnet 73 was energized over the circuit described above, a locking circuit holding the same temporarily energized was completed from one side of battery 61 at the junction of conductors 75 and 85, thence through resistor 86, thermostatic element 87, conductor 88, the armature of electromagnet 73 and back to the other side of battery 61 at the point where member 72 contacts with the terminal of conductor 71. Current flowing over this circuit last mentioned causes radiation of heat from resistor 86 and, after elapse of a predetermined suitable period, as ten or fifteen seconds, more or less, the thermostatic element 87 moves from the terminal of conductor 88 and opens the circuit of electromagnet 73, provided that, at this time, none of the armatures 76, 77 and 78 are in engagement with their respective contacts 79, 80 and 81. When the circuit through the energizing coil of electromagnet 73 is opened, illumination of filament 16 ceases and coil 32 is deenergized, as a result of which the recording mechanism is placed in its non-operative condition. However, should some or all of the armatures 76, 77 and 78 still be in engagement with their respective contacts, the recording mechanism is not rendered non-operative.

As an example of a transient by which operation of the recording mechanism is instigated, it may be assumed that the conductors A and B somewhere to the left of the switch or circuit breaker, comprising the contacts 39, 40 and 41, are short circuited in some manner. As a result, excessive current traverses the circuit comprising the conductors A, B and C, the relay 47 is energized, and operation of the recording mechanism is started. This excessive current coacting with suitable mechanism, not shown, causes the aforesaid switch to open. Ordinarily, in a great power system, the switch is almost immediately automatically closed and then, if the short circuit has not been cleared, is immediately automatically reopened. The switch may thus be opened and closed in an automatic manner for a number of times during the elapse of some two or three seconds, a sufficient period for the ordinary short circuit to clear itself. The recording mechanism which was placed in operation by the initial surge of current records the time of occurrence of the transient and also forms a record on the film 21 of the power transmitted by the circuit A, B and C during the disturbed period, that is, during the repeated opening and closing of the circuit, the information thus obtained being extremely valuable from an engineering viewpoint. After the transient is over, the recording mechanism is rendered non-operative by the bimetallic element 87 and so remains until a relay 58, 47 or 63 is again actuated to instigate another cycle of operation, when a record is obtained of the time of occurrence of the event causing the operation and a record obtained, on another section of film 21, of the power transmitted during the disturbed period.

Usually, a transient causes a surge of current by which the relay 47 is first actuated and thereafter, in response to sub-normal voltage, relay 58 is sufficiently deenergized to permit its armature 76 to move into engagement with contact 79. Obviously, if relay 47 is first energized and so remains, any operation of relay 58 is ineffective in producing operation of the control mechanism. It may happen, however, that the transient or other effect produces sub-normal voltage on the circuit affected, either with or without a subsequent surge of current. Under such circumstances, utilization of the relay 58, or equivalent, brings the recording mechanism into operation when, otherwise, such operation would not be effected so promptly, if at all.

As stated, relay 58 releases its armature 76 when the voltage across the circuit comprising the conductors B and C is sub-normal in value. Thus, should said circuit be open, intentionally or otherwise, the voltage drops to zero and armature 76 moves into engagement with contact 79. As a result, as hereinbefore described, operation of the recording mechanism is effected and such operation continues during the persistence of the sub-normal or no-voltage condition. In the event that the circuit is left open intentionally, as stated above, it is obvious that the recording mechanism should not be left in an operating condition, and, therefore, to advise an operator or attendant of such condition, it is desirable to utilize suitable control or indicating mechanism, which may comprise the resistor 82, thermostatic element 83 and lamp or heating element 84. When armature 76 moves into engagement with contact 79, current traversing the conductor 75 passes through he thermostatic element 83, and, due to the relative resistances, only slightly, if at all, through lamp 84. After lapse of a predetermined time period, thermostatic element 83, under the influence of heat radiated from resistor 82, changes its configuration and opens the circuit therethrough at its movable end, whereby all the current traversing the conductor 75 is caused to pass through lamp 84. This current is insufficient to hold electromagnet 73 closed; hence contact member 72 moves from its coacting contacts and relay 32 is deenergized. Accordingly the lamp is extinguished and movement of film 21 stopped. Accordingly, the luminosity of said lamp is increased to a marked extent and an observer is advised concerning the existing condition. Or, lamp 84, or equivalent, may be utilized as a combined signal and heating element or a heating element alone, in which case it functions to apply heat to bimetallic element 83 to maintain it in deformed position, with its free end removed from the contact coacting therewith.

Operation of the recording mechanism may be initiated by a manual act. For example, as illustrated in Fig. 1, it may be desirable to associate synchronous machinery in the circuit A, B, C at the right of the switch, comprising the contact members 39, 40 and 41, with other similar machinery at the left of said contact members. When the relation is proper, or approximately so, the operator may close the switch 60 to energize electromagnet 59 and close members 39, 40 and 41 upon their respective contacts. In so doing, relay 63 is energized, whereupon armature 78 moves into engagement with contact 81, and the recording mechanism is set in operation to form a record of the time of closure of switch 60 and the power transmitted by the circuit comprising the conductors A, B and C while the synchronizing operation is being effected.

The mechanism for imparting movement to film 21 may assume any one of a variety of forms. Thus, in lieu of the relay-controlled spring motor illustrated in Fig. 1, there may be utilized a construction of the character illustrated in Fig. 4, wherein the sprocket or drum 24 is connected, by a shaft 90, or other suitable driving mechanism, to the armature 91 of a suitable electric motor. With such an arrangement, the conductors 33 and 34, instead of being connected to the relay 32, are connected in circuit with armature 91. The usual shunt field winding 92, when energized, coacts with armature 91 to effect rotation of shaft 90. One terminal of winding 92 may be connected to conductor 34, and the other terminal 93 of said winding 92, may be connected to a suitable source of electrical energy, for example, the battery 61 of Fig. 1, in which case, the conductor 33 should lead to a central relay, such as the electromagnet 73 of Fig. 1.

As will be readily understood, when the apparatus of Fig. 4 is substituted for the equivalent apparatus of Fig. 1, the operation is the same in that movement of the film 21 occurs immediately in response to energization of relays 58, 47 and 63, or any of them.

In Fig. 2 is diagrammatically illustrated an arrangement wherein an indication is obtained of the power transmitted over a path between the contacts of a switch or circuit breaker upon opening thereof and during persistence of an arc between the fixed and movable contacts. As shown, the system is single-phase in character and comprises the conductors $A_1$ and $B_1$ rupture of which is effected by a switch or circuit breaker having the contact member 100 adapted to bridge a set of fixed contacts interposed in one of the conductors, for example, conductor $B_1$. For actuating contact member 100, there may be utilized actuating mechanism of the character shown in Fig. 1.

Connected to the aforesaid conductor $B_1$ on each side of the aforesaid switch or circuit breaker are the terminals of a conductor 101 in which is included the primary winding 102 of a potential transformer 103. Connected to the conductors 9 and 10 of galvanometer structure of the character illustrated in Fig. 1 are the terminals of a conductor 104 in which is included the secondary winding 105 of transformer 103. Ordinarily, conductor 104 should include an adjustable current-limiting resistance 105. In the example illustrated, conductor $B_1$ forms the primary for a current transformer 106, the secondary winding 107 of which has the terminals of a conductor 108 connected thereto. Conductor 108 includes the field winding 12 for the galvanometer mechanism and the winding of the relay 47 by which operation of the recording mechanism is initiated.

As will be readily understood, in response to a transient or other effect, excessive current passes over the circuit comprising the conductors $A_1$, $B_1$ and effects actuation of mechanism, not shown, for moving contact member 100 from its coacting fixed contacts. At the same time, in response to the abnormal high current, relay 47 is energized to attract its armature 77. Recording mechanism of the character illustrated in Fig. 1 may be associated with the above described circuit and, therefore, upon energization of relay 47, filament 16 is quickly brought to a degree of excessive luminosity, the face of clock 36 is photographed on film 21, and the film is set in motion. As a result, the time of occurrence of the transient or other event is recorded, as is the power passing between the switch contacts during the arcing period.

As hereinbefore stated, the galvanometer mechanism including the vibratory system may be of any suitable character. Should it be desired to obtain records of either power circuit current or voltage or both, there may be utilized galvanometer mechanism of the character illustrated in my aforesaid applications Serial No. 757,586 and Serial No. 5,166. In addition to the structure hereinbefore described, such an arrangement is diagrammatically illustrated in Fig. 2, wherein a permanent magnet 110 comprises spaced pole faces forming an air gap in which is disposed the vibratory system comprising a pair of conductors 111 and 112 having a mirror 113 secured thereto.

As shown at the left of Fig. 2, conductors 111 and 112 are connected in the circuit of conductor 104 and when so connected, the mirror 113 deflects solely in response to changes in voltage across the line AB of the arc, provided the conductors 101 are connected across said line.

As shown near the right of Fig. 2, a permanent magnet galvanometer has its vibratory conductors 111 and 112 connected by a conductor 114 through an adjustable current-limiting resistance 115 to the terminal of a shunt 116 in the circuit of conductor 108, the shunt being utilized to cause passage of a suitable small current through the conductors 111 and 112. Obviously, the mirror 113 of the galvanometer mechanism last mentioned deflects solely in response to changes in current.

The galvanometer mechanisms illustrated in Fig. 2 may be utilized individually or as a group to simultaneously record the power, voltage and current characteristics of the arc arising when the contact member 100 moves from its coacting contacts. These records and the time of occurrence thereof may be simultaneously formed on a single film of the character illustrated in Fig. 1. Or, for each galvanometer mechanism, there may be utilized a separate film, either with a common light-emitting filament 16 or a separate filament for each galvanometer.

The terminals of the primary winding 102, obviously may be connected across the conductors $A_1$ and $B_1$, instead of as illustrated in Fig. 2, yielding substantially the same arrangement as in Fig. 1 with the exception that the power system is single phase rather than three phase.

Obviously, operation of the control mechanism with the arrangement illustrated in Fig. 2 may be initiated otherwise than by the current relay 47. For example, there may be utilized a relay connected as is the relay 58 of Fig. 1 to effect operation upon occurrence of sub-normal voltage.

In Fig. 3, my invention is illustrated in connection with a direct current line comprising the conductors $A_2$ and $B_2$ supplied with energy by a suitable source of power 120. Interposed in one of the said conductors, for example, conductor $B_2$ is the winding of the relay 47. Likewise, connected in said conductor $B_2$ is a non-inductive shunt 121 across which are connected the conductors 122 and 123 leading respectively to the conductors 9 and 10 supporting the vibratory mirror 11 of the magnetizable structure 7. The energizing winding 12 of said magnetizable structure 7 has its terminals connected respectively by the conductors 124 and 125 across the conductors $A_2$ and $B_2$. In one of said conductors 124 or 125 there should be included the resistance 126 for the purpose of keeping the current in the field winding in phase with the line voltage.

In response to a transient or other effect, excessive current passes over the circuit comprising the conductors $A_2$ and $B_2$. Relay 47 is energized and attracts its armature 77 to set in operation apparatus of the character illustrated in Fig. 1 or its equivalent. In so doing, a record is formed of the time of the transient and the power transmitted during persistency thereof.

It shall be understood that my invention comprehends in any type of circuit, whether for direct or alternating current, or for any quantity, a characteristic of which it may be desirable to observe, the utilization of galvanometer mechanism, for example, as disclosed in my aforesaid applications Serial No. 757,586, filed December 23, 1924, and Serial No. 5,166, filed January 27, 1925, for forming records indicative of the instantaneous magnitudes of either current or voltage, or for forming a record indicative of the instantaneous magnitudes of a current varied in accordance with a characteristic of a quantity. It shall also be understood that in lieu of galvanometer mechanism of the character last specified there may be utilized galvanometer mechanism, as disclosed in my aforesaid application Serial No. 182,653, for forming a record indicative of the instantaneous magnitudes of the power transmitted by a circuit or of the instantaneous magnitudes of a factor produced jointly by a plurality of other factors. Or, the vibratory system, or the like, of suitable galvanometer mechanism may be suitably damped or controlled whereby there is obtained a record indicative of the average values of current, voltage or electrical power.

In one of its primary phases, my invention comprehends an arrangement for recording or indicating the time of occurrence of an event effecting changes in the magnitude of current, voltage or electrical power and substantially concurrently recording on a moving light-sensitive surface a curve or curves indicative of the instantaneous magnitudes of the quantity or a plurality thereof. Hence, it shall be understood that the herein-disclosed arrangements for initiating operation of the recording mechanism, shown as it is in connection with particular types of power circuits is merely illustrative and not limiting. In short, my novel recording system may be utilized for any desired purpose and in any desired manner, for example, as heretofore proposed in connection with simple measuring or indicating instruments by which readings have been taken of the current or voltage existing in or across a circuit during the existence of a condition simulating a transient.

I claim as my invention:

1. A recording system comprising a light-sensitive surface, an element deflected in accordance with a characteristic of a quantity, a time-indicating device, a source of light for directing light beams to said element and to said time-indicating device from both of which they are reflected onto said surface, and means for momentarily supplying to said source of light an excessive amount of energy, whereby the face of said time-indicating device is substantially instantaneously photographed upon said light-sensitive surface.

2. A recording system comprising a light-sensitive surface, a source of light means for passing a beam of light from said source into coacting relation with said surface, means for deflecting said beam in accordance with changes in a characteristic of a quantity as effected by the occurrence of an event, a time-indicating device, and means including said source of light for photographing the face of said time-indicating device on said surface.

3. A recording system comprising a sensitized surface, means including a light source for passing an energy-beam into coacting relation therewith, means for deflecting said energy-beam in accordance with changes in a characteristic of a quantity as effected by the occurrence of an event, means including said light source for fixing the time of occurrence of said event.

4. A recording system comprising a light-sensitive surface, means for passing a beam of light into coacting relation therewith, means for deflecting said beam in accordance with changes in a characeristic of a quantity as effected by the occurrence of an event, a source of light, a time-indicating device illuminated thereby, and means actuated in response to the occurrence of said event for momentarily supplying an excessive quantity of energy to said source of light to produce light rays of such intensity that the face of said time-indicating device is substantially instantaneously photographed on said surface.

5. The combination with a recording system comprising a light-sensitive surface, an element vibrated in accordance with the characteristics of a quantity, a time-indicating device, and a source of light for directing light beams to said element and to said time-indicating device from both of which they are reflected onto said surface, of means actuated in response to an event affecting a characteristic of said quantity for momentarily supplying an excessive amount of energy to said source of light to produce light rays of such intensity that the face of said time-indicating device is substantially instantaneously photographed upon said surface, means for decreasing the rate at which energy is supplied to said source of light, and means for moving said surface with respect to said element.

6. A recording system comprising a light-sensitive surface, an element deflected in accordance with a characteristic of a quantity, a source of light for directing light rays to said surface and thence to said element, and means for effecting movement of said light-sensitive surface comprising a plurality of devices individually actuated in response to the occurrence of an event affecting a characteristic of said quantity.

7. A recording system comprising a source of light, a light-sensitive surface, means including a deflecting element for deflecting a beam of light from said source against said surface, in accordance with the variations of an electrical quantity, means including a relay for impressing a beam of light from said source on said deflecting element in response to a marked change in the value of said electrical quantity, a third means including a second relay for maintaining said beam of light impressed on said deflecting element, and means for making said third means inactive after not less than a predetermined time.

8. A recording system comprising a source of light, a light-sensitive surface, means including a deflecting element for deflecting a beam of light from said source against said surface in accordance with the variations of an electrical quantity, means including a relay for impressing a beam of light from said source on said deflecting element in response to a marked change in the value of said electrical quantity and for putting said light-sensitive surface in motion, a third means including a second relay for maintaining said beam of light impressed on said deflecting element and for maintaining said light-sensitive surface in motion, and means for making said third means inactive after not less than a predetermined time.

9. A recording system comprising a source of light, a light-sensitive surface, means including a deflecting element for deflecting a beam of light from said source against said surface in accordance with the variations of an electrical quantity, means including a relay for impressing a beam of light from said source on said deflecting element in response to a marked change in the value of said electrical quantity, and for putting said light-sensitive surface in motion, a third means including a second relay for maintaining said beam of light impressed on said deflecting element and for maintaining said light-sensitive surface in motion, and means including a thermal relay for making said third means inactive after not less than a predetermined time.

10. A system for recording a disturbance occurring in an electrical circuit, said system comprising means for generating a beam of energy, a recording surface sensitive to said beam, means for deflecting said beam against said surface in accordance with said disturbance, means including a relay for impressing said deflected beam against said surface in response to the occurrence of said disturbance, and means for making said third-named means inactive after not less than a predetermined period and for returning said third-named means to its original responsive condition.

11. A system for recording a disturbance occurring in an electrical circuit, said system comprising an incandescent lamp, a light-sensitive surface, means for deflecting a beam of light from said lamp against said surface in accordance with said disturbance, means including a relay for lighting said lamp in response to the occurrence of said disturbance, and means for extinguishing said lamp after not less than a predetermined time and for returning said second-named means to its original responsive condition.

12. A system for recording a disturbance occurring in an electrical circuit, said system comprising an incandescent lamp, a light-sensitive surface, means for deflecting a beam of light from said lamp against said surface in accordance with said disturbance, means including a relay for lighting said lamp in response to the occurrence of said disturbance and for moving said light-sensitive surface, and means for extinguishing said lamp and stopping the movement of said light-sensitive surface after not less than a predetermined time and for returning said second-named means to its original responsive condition.

13. A system for recording the variation of an electrical quantity, said system comprising a means for generating a beam of energy, a recording surface sensitive to said beam, means for deflecting said beam against said surface in accordance with the variation of said quantity, means including a relay for impressing said deflected beam against said surface in response to the variations of said quantity, and means for returning said third named means to its original responsive condition.

14. A system for recording disturbances occurring in an electrical circuit, said system comprising a light source, a light-sensitive surface, means for deflecting a beam of light from said source against said surface in accordance with said disturbance, means including a relay for energizing said source in response to the occurrence of said disturbance, and means for deenergizing said light source at the end of said disturbance and for returning said second named means to its original responsive condition.

15. A system for recording a change occurring in an electrical circuit, said system comprising a source of light, a light-sensitive surface, means for deflecting a beam of light from said source against said surface in accordance with said disturbance, means including a relay for energizing said light source in response to the occurrence of said disturbance, and means for deenergizing said light source after a predetermined time and for returning said second named means to its original responsive condition.

16. A system for recording the variation of an electrical quantity, said system comprising an incandescent lamp for supplying a beam of light, a recording surface sensitive to said beam, means for deflecting said beam against said surface in accordance with the variation of said quantity, a second means including a relay for controlling the current flow through said lamp and for impressing said deflected beam against said surface in response to the variations of said quantity, and means for returning said second means to its original responsive condition at the termination of a limited period.

17. A system for recording a disturbance occurring in an electrical circuit, said system comprising a light source, a light-sensitive surface, means for deflecting a beam of light from said source against said surface in accordance with said disturbance, means including a relay for controlling the current flow to said light source in response to the occurrence of said disturbance and for moving said light-sensitive surface, means for discontinuing the passage of light from said light source to said light-sensitive surface and stopping the movement of said light-sensitive surface after at least a portion of said disturbance has been recorded and for returning said second means to its original responsive condition.

18. A system for recording a disturbance occurring in an electrical circuit, said system comprising a light source, a light-sensitive surface, means for deflecting a beam of light from said source against said surface in accordance with said disturbance, means including a relay for controlling the current flow to said light source and for moving said light-sensitive surface in response to the occurrence of said disturbance, means for discontinuing the passage of light from said light source to said light-sensitive surface and stopping the movement of said light-sensitive surface after said disturbance ceases and for returning said second means to its original responsive condition.

19. A system for recording a disturbance occurring in an electrical circuit, said system comprising a light source, a light-sensitive surface, means for deflecting a beam of light from said source against said surface in accordance with said disturbance, means including a relay for controlling the energization of said light source and for moving said light-sensitive surface in response to the occurrence of said disturbance, means for discontinuing the passage of light from said light source to said light-sensitive surface and stopping the movement of said light-sensitive surface at the termination of a limited period and for returning said second means to its original responsive condition.

In testimony whereof, I have hereunto subscribed my name this 9th day of April, 1927.

JOSEPH W. LEGG.